No. 645,621. Patented Mar. 20, 1900.
E. L. GILES.
MEASURING INSTRUMENT.
(Application filed Feb. 27, 1899.)
(No Model.) 2 Sheets—Sheet 1.
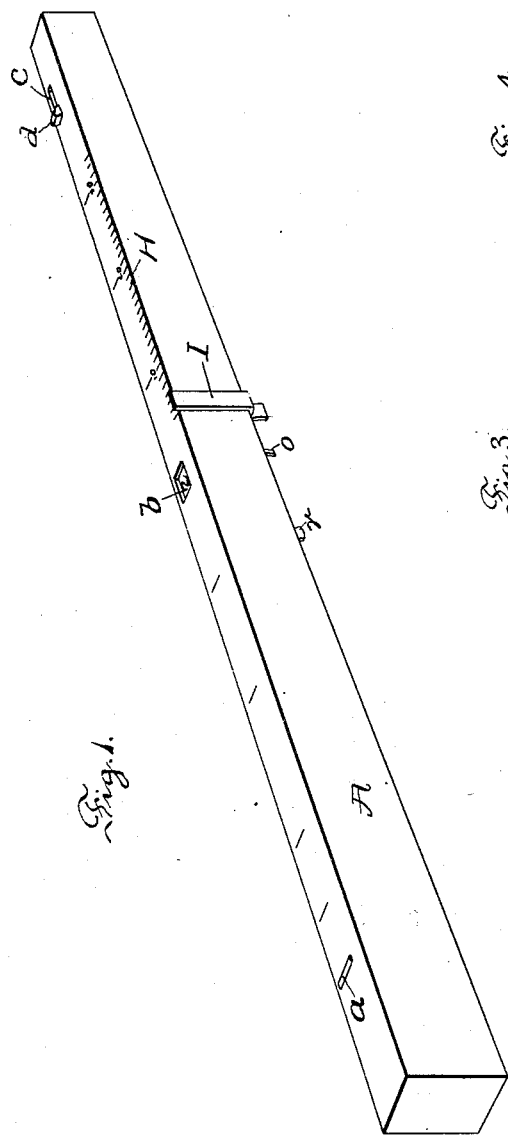
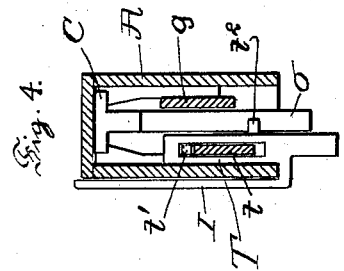
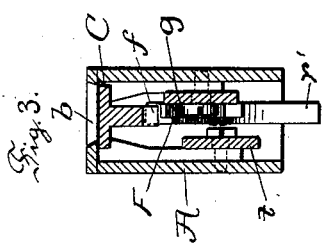
WITNESSES:
INVENTOR
Edwin L. Giles
BY
Geo. H. Graham
ATTORNEY

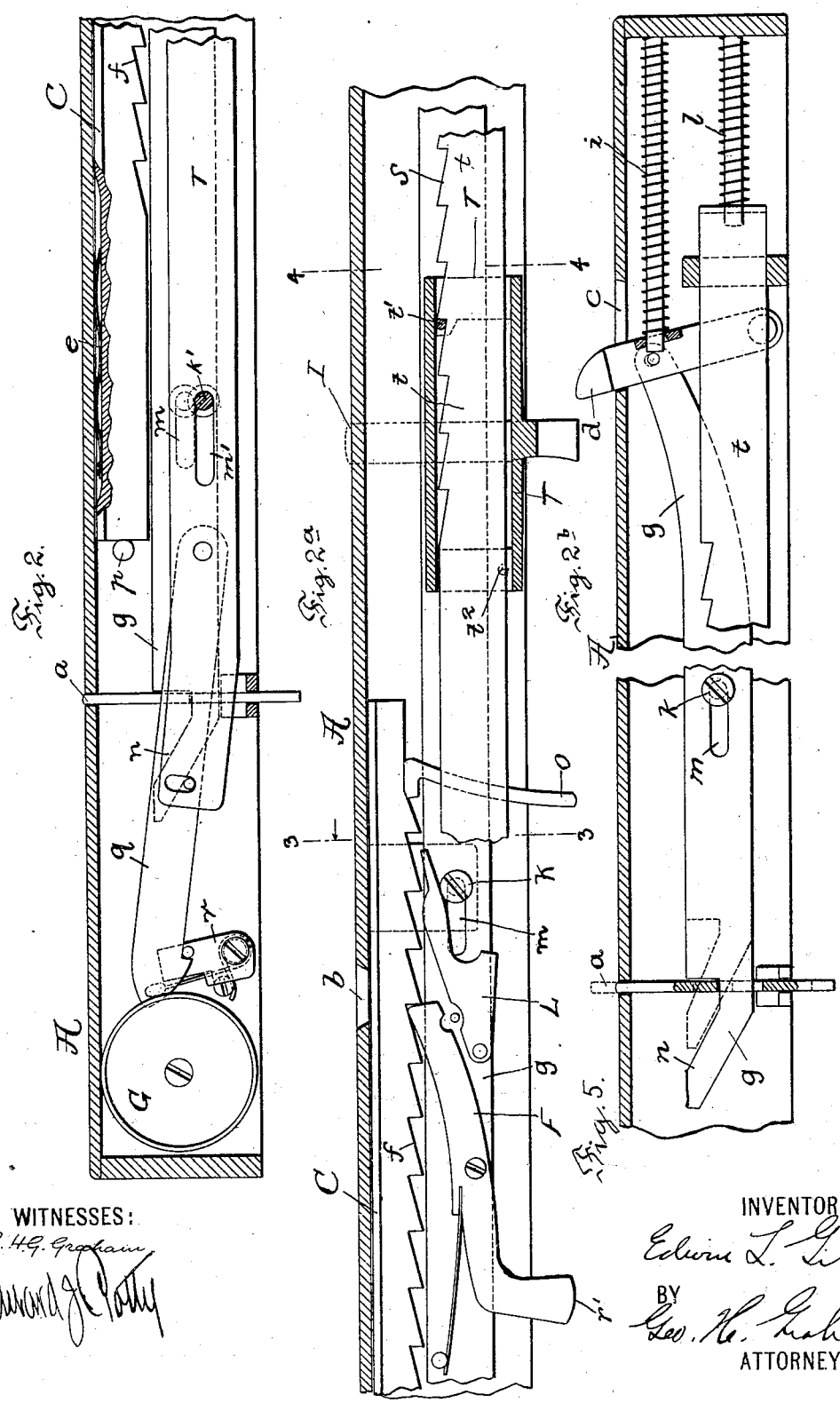

UNITED STATES PATENT OFFICE.

EDWIN L. GILES, OF LOWELL, MASSACHUSETTS, ASSIGNOR TO THE LAMSON STORE EQUIPMENT COMPANY, OF BOSTON, MASSACHUSETTS.

MEASURING INSTRUMENT.

SPECIFICATION forming part of Letters Patent No. 645,621, dated March 20, 1900.

Application filed February 27, 1899. Serial No. 706,998. (No model.)

*To all whom it may concern:*

Be it known that I, EDWIN L. GILES, a citizen of the United States, residing at Lowell, in the county of Middlesex and State of Massachusetts, have invented certain new and useful Improvements in Measuring Instruments, of which the following is a specification.

The present invention relates generally to measuring-machines, and more particularly to those adapted for use in measuring goods, cloth, and the like.

The objects of the improvement are to provide an exceedingly simple form of mechanism, and thereby materially cheapen the machine and lessen the liability of its becoming deranged.

To this end the invention consists in the novel features and the combination of parts hereinafter fully set forth.

In the accompanying drawings a practical embodiment of the improvements is shown, in which—

Figure 1 is a perspective view of the machine. Figs. 2, 2$^a$, and 2$^b$ are together an enlarged sectional elevation thereof, showing the operating mechanism. Fig. 3 is a cross-section on the line 3 3 of Fig. 2$^a$. Fig. 4 is a similar section on the line 4 4 of Fig. 2$^a$. Fig. 5 is a sectional elevation of the left-hand portion of the machine.

Referring to the said drawings, it will be understood that the improved measuring-machine A consists of a rectangular case of a little more than a yard's measurement in length, the case containing the inclosing mechanism and adapted to be secured along the inner edge of a store counter or table for use in measuring goods or the like.

The upper surface of the machine is slotted at its left-hand end to permit the protrusion of a vertically-movable zero-key $a$, is provided about centrally of its length with a sight-opening $b$, through which the underlying numerals of the face of a yards or other measuring bar C are successively exposed, and at its right-hand end is formed with a longitudinal slot $c$ for the protrusion of an operating thumb or finger piece $d$. The upper surface of the machine may also be provided with marks indicating divisions of some unit of measurement, such as fractions of a yard.

For determining and limiting the step-by-step movement of the yards-bar C at the completion of the desired measuring operation the machine is provided with an adjustable stop for the yards-bar C and carries an index I, which projects up the side of the machine in proximity to a scale H on its upper surface and corresponding to the numerals upon the yards-bar. The index and stop being set at the desired numeral serve to prevent the operation of the finger-piece $d$ and yards-bar C after the required number of units have been measured and the corresponding numeral of the yards-bar exhibited through the opening $b$.

The yards-bar C, preferably of T shape, (see Figs. 3 and 4,) is provided with a depressing-spring $e$ for relieving its upper surface of friction upon the casing and is formed on its lower edge with teeth $f$, one tooth for each unit of measurement, with which is arranged to coact a pawl F, which is pivoted to the operating-bar $g$ and moved first to engage with the teeth of the said bar and then to move it longitudinally by a longitudinal movement of said operating-bar. This bar is connected with the operating thumb or finger piece $d$, the return of the operating-bar, pawl, and finger-piece being insured by the stress of a spring $i$ in connection with the finger-piece and a fixed part of the machine.

The operating-bar $g$ is guided longitudinally in the interior of the casing by fixed studs or pins $k$, projecting through slots $m$ in the bar, and at its left-hand end is formed with or carries an incline $n$, arranged to engage a slot in the zero-key $a$.

The key $a$ may be guided for vertical movement by the walls of slots in the inclosing case of the machine and normally lies with its upper surface about flush with the upper surface of the case. When, however, the operating-bar is moved to the right, the incline $n$ of said bar cams or raises the zero-key $a$ upwardly to protrude its upper end some distance above the upper surface of the inclosing case, so as to form an easily-accessible and prominent piece with which the goods being measured may be engaged by the finger. Upon the measuring of a unit of measurement and on the return of the operating finger-piece $d$ and the bar $g$ the incline on the latter will have moved to the left and the zero-key thereby lowered ready for another protrusion on the movement of the finger-piece $d$ to the right in the act of measuring another unit of measurement.

Each time the finger-piece $d$ is moved to the right the pawl F moves the yards-bar C one step to the right, exposing successive numbers on the face of said yards-bar through the opening $b$, and starting the measuring movement, with the zero number of said bar exposed through said opening, the measuring operation will have been completed when the yards-bar has been sufficiently moved to expose the correct number thereon through the opening $b$.

Upon each operation of the bar $g$ a pawl L, pivoted thereon, is forced or cammed upward by the pin or stud $k$ or other stationary portion to lock into the teeth $f$ and so to prevent any further movement of the yards-bar backward until the finger-piece has returned to its normal position and the pawl F engaged in the succeeding tooth.

At the completion of any measuring movement the pawl F is disengaged from the teeth $f$ by means of its depending portion $r'$ and the yards-bar C then may be returned to zero or normal position by means of a pin $o$, which is attached and depends from the bar through the open under side of the inclosing case, the yards-bar being moved thereby to the left against a fixed stop $p$.

The adjustable stop T is mounted on a longitudinally-arranged bar $t$, supported in the casing A, for slight longitudinal movement and provided on its upper edge with a rack or succession of teeth S, normally engaged by a pawl or pin $t'$ upon the stop. The stop or a pin $t^2$, formed thereon, after being set upon the rack in the required position according to the index I is adapted at the completion of a measuring operation to abut the yards-bar and stop its further step-by-step progressive movement and prevent further operation of the finger-piece $d$ until the next setting of the parts for a subsequent measuring operation. When the yards-bar has reached the limit of its step-by-step movement, an alarm (see Fig. 2) in the form of a bell G, with its hammer, may be sounded. For this purpose the bar $t$ is held against a spring $l$ and is mounted on the studs $k'$, projecting in slots $m'$ in the bar, and carries or operates a hook or pawl $q$, arranged to engage a pin on a hammer-lever $r$, so that when the yards-bar C is moved against the pin $t^2$ or stop T the bar $t$ is in turn moved or longitudinally reciprocated and the bell struck.

In operation—say for measuring five yards of goods—the stop T is adjusted on its bar $t$ so that its index I registers with the numeral "5" on the side of the case, it being assumed that at this time the yards-bar C indicates zero through the opening $b$. In measuring the goods the finger-piece $d$ is moved to the right, imparting a single-step movement of the yards-bar also toward the right, indicating one yard's measurement. The finger-piece is released and the goods then measured for the second yard by again moving the finge-piece to the right. These operations will be repeated until at the completion of the fifth operation of the finger-piece the numeral "5" on the yards-bar appears at the opening $b$. Just before the yards-bar exhibits said numeral the yards-bar will have abutted against the pin $t^2$ or stop T, and in completing its step movement will longitudinally move the stop-carrying bar $t$ to sound the alarm. When another measurement is to be made, the yards-bar is moved to its zero or normal position, and the stop T is adjusted on its bar to indicate the desired yards' measurement.

What I claim is—

1. In a measuring-machine, the combination of an operating finger-piece, a zero-key and connections with the finger-piece for raising the key each time the finger-piece is moved, as described.

2. In a measuring-machine, the combination of a yards or other indicating bar, a finger-piece, a pawl operated by said finger-piece for engaging and moving said bar, and a zero-key protruded by the movement of said finger-piece, as described.

3. In a measuring-machine, the combination of a longitudinally-movable operating-bar, and a zero-key raised and lowered by the reciprocation of the operating-bar, as described.

4. In a measuring-machine, the combination of a longitudinally-reciprocating operating-bar having an incline and a vertically-movable zero-key engaged by said machine, as described.

5. In a measuring-machine, the combination of a yards-bar, a pawl for engaging and moving said bar, an operating finger-piece, zero-key and connections between the finger-piece and zero-key for protruding it and with the yards-bar for moving it, as described.

6. In a measuring-machine, the combination of a finger-piece, a movable yards-bar operated by the finger-piece and a stop for the yards-bar movable independent of the yards-bar to define its movement, as described.

7. In a measuring-machine, the combination of a movable yards-bar, an operating-bar, an adjustable stop for the yards-bar and an index, as described.

8. In a measuring-machine, the combination of a movable yards-bar, a yielding stop for the yards-bar, an alarm and a pawl in connection with the stop for operating the alarm, as described.

9. In a measuring-machine, the combination of a movable yards-bar, a stop therefor, a longitudinally-movable bar and an alarm operated by the movement of the bar, as described.

10. In a measuring-machine, the combination of a movable yards-bar, an operating-bar and a pawl carried thereon and adapted to lock and engage with the yards-bar upon the movement of the operating-bar, as described.

Signed at Boston, in the county of Suffolk and State of Massachusetts, this 16th day of February, A. D. 1899.

EDWIN L. GILES.

Witnesses:
AUGUSTIN I. DAVIS,
CHAS. W. LOCKE.